H. R. REYNOLDS & F. C. BEEBE.
STABILIZER FOR MOTOR VEHICLES.
APPLICATION FILED MAR. 27, 1916. RENEWED MAY 5, 1917.

1,231,066.

Patented June 26, 1917.

Witness:
G. F. Juechek

Inventors
H. R. Reynolds
and F. C. Beebe
By Orwig & Bair

UNITED STATES PATENT OFFICE.

HAE R. REYNOLDS AND FRANK C. BEEBE, OF BEDFORD, IOWA.

STABILIZER FOR MOTOR-VEHICLES.

1,231,066. Specification of Letters Patent. Patented June 26, 1917.

Application filed March 27, 1916, Serial No. 87,122. Renewed May 5, 1917. Serial No. 166,770.

*To all whom it may concern:*

Be it known that we, HAE R. REYNOLDS and FRANK C. BEEBE, citizens of the United States, and residents of Bedford, in the county of Taylor and State of Iowa, have invented a certain new and useful Stabilizer for Motor-Vehicles, of which the following is a specification.

The object of our invention is to provide a stabilizer for motor vehicles, of simple, durable and inexpensive construction.

A further object is to provide a stabilizer whereby the bodies of automobiles in which the body is mounted on a spring and the spring is pivoted by shackles or the like on the chassis, may be held against swaying from side to side.

Figure 1:
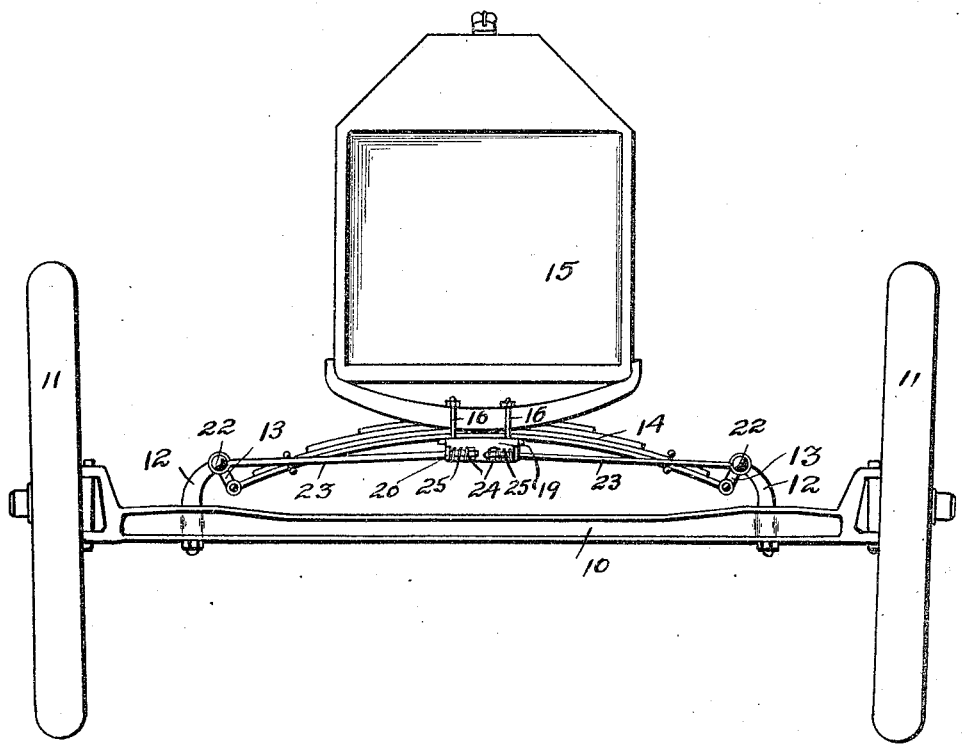
Figure 2:
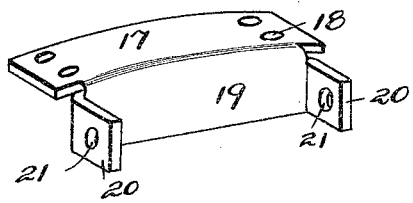

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a front elevation of a motor vehicle equipped with a stabilizer embodying our invention, and Fig. 2 shows a perspective view of a part of the stabilizer.

In the accompanying drawings we have used the reference numeral 10 to indicate generally a front axle of a motor vehicle on which are suitably mounted wheels 11. Extending upwardly from the front axle near the ends thereof, are the brackets 12, to which are pivotally connected the shackles or yokes 13 which support the ends of the spring 14. The front portion of the body 15 of the machine rests upon the spring 14 and is secured thereto by U-bolts 16.

In machines of this type it is found that there is some objection to the construction on account of the manner in which the parts are connected, whereby when the machine is traveling over rough roads the body of the car tends to swing too much from side to side. For preventing this swinging motion, we have provided our stabilizer, which comprises a plate 17 curved from its central line downwardly and outwardly to its ends, as shown in Fig. 2, to fit the under side of the spring 14. In the ends of the plate 17 are openings 18 to receive the shanks of the U-bolts 16.

At the forward edge of the plate 17 is a downwardly extending flange 19 having at its ends the forwardly extending flanges 20. Each flange 20 is provided with an opening 21.

Pivotally mounted on the bolts 22 whereby the shackles 13 are mounted on the brackets 12, are rods 23 extending through the respective holes 21, as shown in Fig. 1. The inner ends of the rods 23 are spaced slightly from each other when the spring is at its lower position of movement.

On the adjacent ends of the rods 23 are nuts 24. Between each nut 24 and the adjacent flange 20 is a coil spring 25. It will readily be seen that when the parts are installed in the position shown in Fig. 1, that the springs 25 tend to reinforce the spring 14, and that the stabilizer tends to prevent any movement of the spring 14 resulting from the side swing of the body 15.

It will readily be seen that the entire front end of the body, together with the spring 14, tends to swing laterally on the brackets 12 when the machine is traveling over rough roads, and this lateral swinging is cushioned and largely prevented by our stabilizer.

Some changes may be made in the construction and arrangement of the parts of our improved stabilizer without departing from the essential features and purposes thereof, and it is our intention to cover by our present application for patent any such modifications of structure as may be included within the scope of our claims.

We claim as our invention:

1. A stabilizer for motor vehicles, comprising a plate curved from its central portion downwardly and outwardly to its ends, a downwardly extending flange at the front edge of said plate, forwardly extending parallel flanges at the ends of said first flange, means for securing said plate below a spring, a pair of alined rods having their adjacent ends slidably extended through the respective forwardly extending flanges, means for supporting the outer ends of said rods rigid with relation to the axle of the vehicle, nuts on the inner ends of said rods, and springs on said rods between said nuts and said forwardly extending flanges.

2. A stabilizer for motor vehicles, comprising a supporting member adapted to be mounted on the central lower portion of the spring, having forward extensions, rods slidably mounted in said extensions, and extending away therefrom, and having their outer ends secured with relation to the axle of a vehicle, nuts on the inner ends of said rods, and springs on said rods between said nuts and said forward extensions.

Des Moines, Iowa, March 11, 1916.

HAE R. REYNOLDS.
FRANK C. BEEBE.

Copies of this patent may be obtained for five cents each, by addressing the "Commissioner of Patents, Washington, D. C."

Affidavit having been filed showing that the name of the first-mentioned patentee in Letters Patent No. 1,231,066, granted June 26, 1917, for an improvement in "Stabilizers for Motor-Vehicles," should have been written and printed *Hal R. Reynolds* instead of "Hae R. Reynolds," it is hereby certified that the proper correction has been made in the files and records pertaining to the case in the Patent Office and should be read in the said Letters Patent that the same may conform thereto.

Signed and sealed this 17th day of July, A. D., 1917.

[SEAL.]

F. W. H. CLAY,
*Acting Commissioner of Patents.*

Cl. 21—182.